United States Patent [19]

Fergason

[11] Patent Number: 5,113,270

[45] Date of Patent: May 12, 1992

[54] VARIABLE DENSITY LIGHT CONTROL APPARATUS

[76] Inventor: James L. Fergason, 92 Adam Way, Atherton, Calif. 94025

[21] Appl. No.: 602,056

[22] Filed: Oct. 19, 1990

Related U.S. Application Data

[63] Continuation of Ser. No. 261,045, Oct. 21, 1988, abandoned, which is a continuation-in-part of Ser. No. 259,951, Oct. 19, 1988, abandoned.

[51] Int. Cl.⁵ .................................................. G02F 1/133
[52] U.S. Cl. ........................................ 359/37; 359/51; 359/52; 359/98; 351/49
[58] Field of Search ............... 350/337, 351, 347 R, 350/347 E, 347 V, 352, 349, 400, 407, 374, 396, 398; 351/49

[56] References Cited

U.S. PATENT DOCUMENTS

| | | | |
|---|---|---|---|
| 4,048,358 | 9/1977 | Shanks | 350/351 X |
| 4,190,330 | 2/1980 | Berreman | 350/347 R |
| 4,264,154 | 4/1981 | Petersen | 351/49 |
| 4,279,474 | 7/1981 | Belgorod | 350/331 R |
| 4,416,514 | 11/1983 | Plummer | 350/337 |
| 4,556,289 | 12/1985 | Fergason | 350/347 E |
| 4,560,239 | 12/1985 | Katz | 350/331 R |
| 4,579,426 | 4/1986 | Onufry | 350/407 |
| 4,641,922 | 2/1987 | Jacob | 350/331 R |
| 4,688,900 | 8/1987 | Doane et al. | 350/347 V |
| 4,756,605 | 7/1988 | Okada et al. | 350/347 R |
| 4,848,875 | 7/1989 | Baughman et al. | 350/331 R |
| 4,893,902 | 1/1990 | Baughman et al. | 350/331 R |
| 4,899,503 | 2/1990 | Baughman et al. | 350/331 R |
| 4,943,152 | 7/1990 | Whelan | 351/49 |
| 4,968,127 | 11/1990 | Russell et al. | 351/49 |

FOREIGN PATENT DOCUMENTS

85/04262  9/1985  World Int. Prop. O. .......... 350/334

*Primary Examiner*—Stanley D. Miller
*Assistant Examiner*—Anita Pellman Gross
*Attorney, Agent, or Firm*—Renner, Otto, Boisselle & Sklar

[57] ABSTRACT

A variable density light control apparatus includes plural polarizers, at least two of which are at least partially crossed, and at least one of the polarizers being variable to the extent that it polarizes light as a function of a prescribed input, thereby to control the intensity of light transmitted through the apparatus proportionally to the intensity of the incident light to the apparatus. The range of intensity control can be varied according to the crossed relationship of the polarizers and/or according to the polarization effectiveness of the controllable polarizer. Color effects can be controlled. The apparatus may be utilized in various devices, including displays, windows, eye glasses, and ski goggles.

27 Claims, 6 Drawing Sheets

VARIABLE DENSITY LIGHT CONTROL APPARATUS

CROSS-REFERENCE TO RELATED APPLICATION

This is a continuation of copending application Ser. No. 07/261,045 filed on Oct. 21, 1988, now abandoned, which is a continuation-in-part of Ser. No. 259,951 filed on Oct. 19, 1988, now abandoned, for "Controlled Liquid Crystal Optical Polarizer, Method and Apparatus", the entire disclosure of which hereby is incorporated by reference.

TECHNICAL FIELD

The invention relates to a variable density light control apparatus and method and, more particularly, to such apparatus and method which uses a variable liquid crystal optical polarizer.

BACKGROUND

As is well known, unpolarized light is comprised of light in which the electric vector is randomly oriented; the direction of the electric vector is orthogonal to the direction of propagation of the light. Plane polarized light or linearly polarized light is light in which the electric vector generally is oriented in a single plane. Various means have been used in the past to polarize light, especially to convert unpolarized light to linearly polarized light.

Most, if not all, prior art polarizers provide a fixed amount of polarization It would be desirable to be able to control polarization of light, i.e., to determine whether light emanating from a polarizer device in response to incident unpolarized light in fact is polarized or unpolarized and if polarized, to what extent polarized. The invention as described further below provides such capability.

The combination of liquid crystal material, for example, nematic liquid crystal or operationally nematic liquid crystal, in a containment medium and methods of making the same are disclosed in U.S. Pat. Nos. 4,435,047, 4,606,611, 4,591,233, 4,707,080 and 4,616,903. In several embodiments disclosed in a number of such patents, pleochroic dye is included in the liquid crystal volumes bounded by the containment medium. In operation, as a function of whether or not the prescribed input is applied, light either is transmitted or light is scattered or absorbed. Absorption primarily is due to the absorption characteristics of the dye; scattering primarily is due to index of refraction considerations.

In U.S. Pat. No. 4,556,289 a combination of liquid crystal and pleochroic dye in volumes formed in a containment medium is disclosed. The liquid crystal has low birefringence characteristics, and the index of refraction thereof is closely matched with that of the containment medium. Therefore, as a function of whether or not a prescribed input is applied, the intensity of light transmitted therethrough can be varied without substantially altering the image characteristics.

The devices disclosed in the above patents are operative substantially independently of optical polarization.

In U.S. Pat. Nos. 4,385,806, 4,436,376, 4,540,243 and Re. No. 32,521 a surface mode switching technique for liquid crystal to control light in response to electric field applied to liquid crystal is disclosed. Other devices which act as a wave guide to reorient the direction of optical polarization of light are known as twisted nematic liquid crystal devices.

A liquid crystal polarizer is disclosed in U.S. Pat. No. 4,048,358. Such polarizer includes an open micropore structure in a polypropylene sheet with liquid crystal material and dichroic dye in the pores. The pores tend to align the liquid crystal along the axis of the pores.

In U.S. Pat. Nos. 4,688,900, 4,685,771, 4,671,618 4,673,255 are disclosed liquid crystal devices in which volumes of liquid crystal material are formed in a containment medium. The patents disclose formation of such volumes of such liquid crystal material by condensation or spontaneous formation techniques. Application of stress to deform the volumes to form a polarizer and index of refraction considerations also are disclosed. Further, a switchable polarizer is mentioned in U.S. Pat. No. 4,688,900.

The entire disclosures of the above patents hereby are incorporated by reference.

SUMMARY

According to one aspect of the invention, a method of making a liquid crystal material polarizer includes casting an emulsion of liquid crystal material with pleochroic dye in a containment medium, and stretching such cast material to form elongate volumes of liquid crystal and pleochroic dye in such containment medium.

According to another aspect, a liquid crystal polarizer is made by the process of casting an emulsion of liquid crystal material and pleochroic dye in a containment medium, and stretching such cast material to form elongate volumes of liquid crystal material and pleochroic dye in such containment medium.

According to still another aspect, an article of manufacture includes a liquid crystal material, a containment medium for containing the liquid crystal material, the containment medium having elongate volumes for containing therein the liquid crystal material and for tending to align the liquid crystal structure by surface interaction generally in parallel with the direction of elongation of the volumes, and means in the liquid crystal material and responsive to the structural alignment thereof for affecting polarization of light incident thereon.

According to a further aspect, a variable optical polarizer includes liquid crystal, a containment medium for containing the liquid crystal, means for affecting the structural alignment of the liquid crystal, the liquid crystal being responsive to a prescribed input to change such structural alignment, and means in the liquid crystal responsive to such structural alignment thereof for affecting polarization of light as a function of such alignment.

A further aspect relates to a liquid crystal polarizer, including a three-dimensional matrix formed by a containment medium having a plurality of elongate generally closed volumes therein, polarizing means for affecting polarization of light incident thereon as a function of the orientation of such polarizing means, and liquid crystal in the volumes for determining the alignment of the polarizing means thereby to determine the polarization affect of the polarizing means.

Even a further aspect relates to an apparatus for making a controllable polarizer, including means for casting a mix of liquid crystal, pleochroic dye and containment medium to form a film-like product, and means to stretch such film-like product prior to final curing thereof.

Another aspect relates to controlling light transmission by using a pair of polarizers, preferably linear polarizers, which are positioned in optical serial relation and in which at least one has a variable polarization characteristic thereby to vary the overall transmission of light.

Another aspect relates to controlling intensity of light transmission without affecting image characteristics or at least minimizing degradation of image characteristics.

Another aspect relates to the controlling of density of an optical filtering device and, thus, controlling intensity of light transmitted through such device, and preferably also to provide for glare reduction of the transmitted light.

Another aspect is to minimize haze in an optical device for controlling light transmission.

Another aspect relates to controlling color of light transmitted through an optical device and preferably also controlling the intensity of such transmitted light. Moreover, the invention preferably reduces glare.

The foregoing and other objects, aspects, features and advantages of the invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed. It will be appreciated that the scope of the invention is to be determined by the scope of the claims.

DESCRIPTION OF THE PREFERRED EMBODIMENTS

Figure 1:
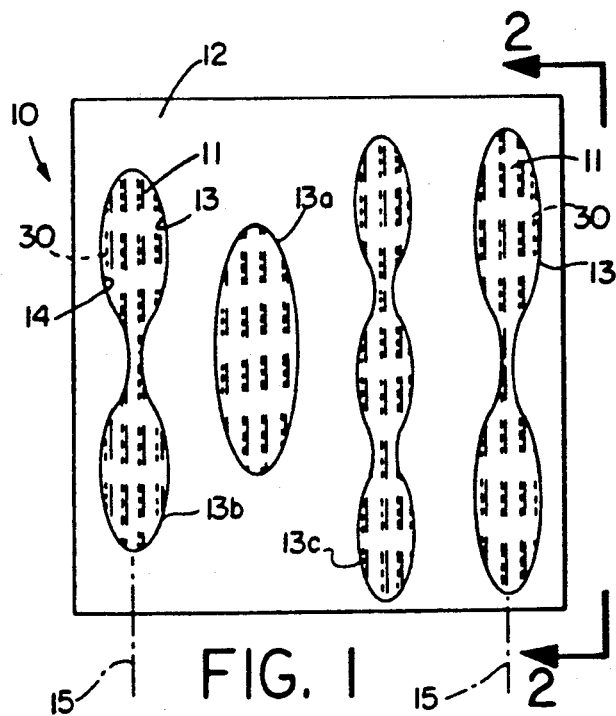
FIG. 1 is a schematic illustration of a controlled liquid crystal optical polarizer in accordance with the invention.
Figure 2:
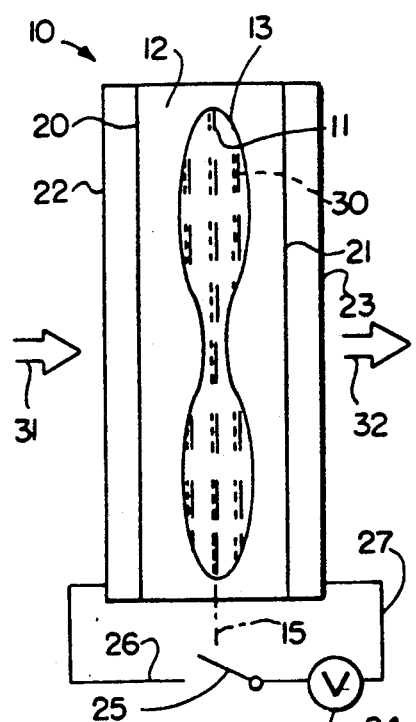
FIGS. 2 and 3 are schematic edge or end views of the polarizer of FIG. 1, in FIG. 2 the polarizer is not energized, and in FIG. 3 the polarizer is energized by a prescribed input.

Referring in detail to the drawings, wherein like reference numerals designate like parts in the several figures, and initially to FIGS. 1 and 2, a controlled liquid crystal optical polarizer is generally designated 10. The polarizer 10 includes liquid crystal material 11 in a containment medium 12. More particularly, the liquid crystal material 11 is bounded by a wall 14 within the containment medium 12. The volume 13 preferably is an elongate volume and is operative by surface interaction with the liquid crystal material 11 to effect generally parallel alignment of the liquid crystal structure with respect to the major, long or elongate axis 15 of the volume 13. Preferably, the length of the volume 13 is appreciably greater than the diameter of the volume, and preferably a number of the volumes are interconnected, e.g., such interconnections being disclosed in several of the above-mentioned patents. The greater the aspect ratio of the volume, i.e., the ratio of length to diameter or width, the greater will be the generally linear alignment of the liquid crystal structure in the manner illustrated schematically in FIG. 1. Such linear structural alignment and parallel relation of such alignment to the axis 15 is depicted in FIG. 1 by the solid lines 11 representing liquid crystal structure in the volume 13.

As is illustrated in FIGS. 1 and 2, the containment medium 12 includes a plurality of the volumes 13 with liquid crystal 11 therein. The volumes may be singular ones, as is represented at 13a in FIG. 1, or when plural volumes have been interconnected and elongated there may be two, three or more elongate volumes in fluidic series relation, as is represented, respectively, for example, at 13b and 13c in FIG. 1. Moreover, although only four volumes are shown in the containment medium 12 in the controlled liquid crystal optical polarizer 10 of FIG. 1, it will be appreciated that the illustration in FIG. 1 is greatly magnified from the actual physical size of a controlled liquid crystal optical polarizer within which four such volumes would be included. Thus, in the area blocked out by the generally rectangular line circumscribing the controlled liquid crystal optical polarizer 10 in FIG. 1, there would be expected to be many more volumes 13 of liquid crystal 11. As an example, the larger diameter or width of such volumes, e.g., as is measured in the horizontal direction across a volume in FIG. 1, might be on the order of from about one-half micron to about seven microns; and the axial length of such volume along the axis 15 would be several times, as is illustrated about two to five times the diameter. However, while it is preferred that the elongation of the volumes be maximized, the invention would operate with a smaller amount of elongation or aspect ratio or a larger amount of elongation or aspect ratio than that mentioned here.

The containment medium 12 preferably forms a three-dimensional matrix of the volumes 13, wherein the volumes effectively are closed to the environment externally of the containment medium 12. The volumes may be in a single layer or in multiple layers; in FIGS. 2 and 3, a single layer arrangement is illustrated for simplicity, whereas in FIGS. 4 and 6 multiple layers are illustrated, which more likely would be the case in a polarizer 10 according to the invention. Referring to FIG. 2, an edge view of the polarizer 10 is illustrated. The liquid crystal 11 is structurally aligned generally along the elongate axis 15 of the volume 13.

Preferably on the surfaces 20, 21 of the containment medium 12 there are respective electrodes 22, 23. At least one of the electrodes is optically transparent and, depending on use of the polarizer 10, possibly both electrodes are transparent. Alternatively, one of the electrodes may be nontransparent, for example, reflecting. Exemplary transparent electrodes may be formed of indium tin oxide, as is well known. Electrodes 22, 23 are used to apply a prescribed input, specifically an electric field, across the liquid crystal material 11. If the energy of such electric field is adequate to overcome the surface interaction of the wall 14 with the liquid crystal 11, the liquid crystal structure tends to align generally in parallel with such electric field in the manner illustrated in FIG. 3, for example. If the applied electric field is less than that necessary to obtain complete alignment in the manner illustrated in FIG. 3, then the liquid crystal structure would tend to be oriented at an angle that is not generally parallel to the axis 15 or to the direction of the electric field, i.e., the liquid crystal would be partly oriented in the direction of the electric field but still would be partly oriented due to the described surface interaction. To accomplish the foregoing alignment characteristics with respect to electric field, it is necessary that the liquid crystal material 11 have positive dielectric anisotropy.

Figure 3:
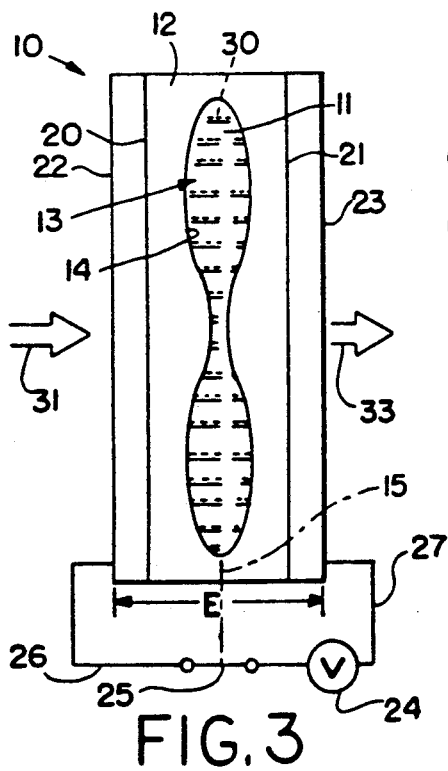

As is illustrated in FIGS. 2 and 3, a voltage source, either an AC source or a DC source, which is generally indicated at 24, is selectively connectable by a switch 25 and electric leads 26, 27 to the electrodes 22, 23 to cause application of electric field E across the liquid crystal. Operation of the liquid crystal to align in accordance with surface interaction and/or with respect to a prescribed input, such as an electric field, is disclosed in a number of the above-mentioned patents.

Included with the liquid crystal material 11 is pleochroic dye 30. The pleochroic dye, sometimes referred to as dichroic dye, may be neutral density or may have color characteristics. Importantly, though, the pleochroic dye 30 is operative to affect polarization of light incident thereon, as is described further below. Moreover, the pleochroic dye 30 has the characteristic to function in guest-host relationship with the liquid crystal material 11. Accordingly, the pleochroic dye, which has a structural orientation, is affected by the liquid crystal material 11 such that the structural orientation of the pleochroic dye will follow generally the structural orientation of the liquid crystal material 11. As is illustrated in FIGS. 1 and 2, the pleochroic dye 30 is aligned in parallel with the structure with the liquid crystal material 11 and, thus, in parallel with the axis 15; and as is seen in FIG. 3, the pleochroic dye is structurally aligned with the structure of the liquid crystal material orthogonally with respect to the axis 15. Although pleochroic dye is preferred, it will be appreciated that other means for affecting polarization of light as a function of orientation thereof and having a structural orientation that can be controlled by liquid crystal material may be utilized in accordance with the invention. Therefore, throughout the patent application it will be appreciated that reference to pleochroic dye includes reference to equivalent means for carrying out the polarization function of the described pleochroic dye.

Operation of the controlled liquid crystal optical polarizer 10 now is summarized. For this summary, the liquid crystal material 11, the containment medium 12, the electrodes 22, 23, and the pleochroic dye 30 are colorless. The liquid crystal material 11, containment medium 12, and electrodes 22, 23 are transparent. Assuming unpolarized light 31 is directed to be incident on the polarizer 10, as is illustrated in FIG. 2, polarized light 32 exits the polarizer 10 when the liquid crystal and dye are structurally aligned in the manner illustrated in FIGS. 1 and 2. The direction of propagation of the incident light 31 is non-parallel with the axis 15, more particularly, such direction of propagation is shown as being generally orthogonal to the axis 15. The invention will function, however, even if the angle of propagation is other than orthogonal; but such angle should be non-parallel with respect to the axis 15, i.e., the direction of elongation of the volumes 13.

The pleochroic dye 30 tends to absorb that incident light of which the electric vector is vibrating in a plane that is parallel to the direction of the structural alignment of the pleochroic dye; sometimes it is said that such electric vector is absorbed. In contrast, the electric vector of the incident light which is vibrating in a direction that is orthogonal to the alignment direction of the pleochroic dye will not be absorbed and, in fact, will be transmitted. Accordingly, the plane of polarization of the output light 132 would be in a direction that is orthogonal or perpendicular to the plane of the drawing of FIG. 2.

Preferably the pleochroic dye 30 does not absorb light that is incident thereon in a direction of propagation parallel to the axis or structure thereof. Therefore, as is illustrated in FIG. 3, the incident light 31, which is unpolarized, will be transmitted through the polarizer 10 and will exit as unpolarized light 33 since the structure of the liquid crystal material 11 and the pleochroic dye 30 are aligned generally in parallel with the direction of propagation of the light 31 through the polarizer 10.

In view of the foregoing, then, it will be appreciated that the polarization characteristics of the light 32, 33 exiting the polarizer 10 in response to incident light 31 will be a function of the alignment characteristics of the pleochroic dye 30 in the volumes 13. The light may be substantially linearly polarized, as light 32 when no electric field is applied across the liquid crystal material 11, may be substantially unpolarized as light 33 when an electric field adequate to achieve the alignment depicted in FIG. 3 is applied to the liquid crystal, and may be partially polarized when there is applied a mid-range electric field that is large enough to cause the liquid crystal (and pleochroic dye) structure to align out of parallel with the axis 15 but not quite fully in the orthogonally aligned relation illustrated in FIG. 3.

The liquid crystal material preferably is nematic liquid crystal or is operationally nematic liquid crystal Operationally nematic means that the liquid crystal material operates as nematic liquid crystal is expected to operate, e.g., nematic liquid crystal tends to have a usual structural alignment that is linear, this being the lowest free energy state thereof in the absence of some mechanism that alters such linear structure. A surface might tend to effect such alteration. Operationally nematic also is defined in several of the above patents, for example, as being a characteristic of liquid crystal such that in the absence of external fields, structural distortion of the liquid crystal is dominated by the orientation of the liquid crystal at its boundaries, for example, due to surface interaction, rather than by bulk effects, such as very strong twists (as is cholesteric liquid crystal material) or layering (as in smectic liquid crystal material). Also, it will be appreciated that use of various ingredients to affect liquid crystal operation such as use of a chiral ingredient which induces a tendency to twist but cannot overcome the effects of boundary alignment would still result in the liquid crystal being considered operationally nematic.

The liquid crystal material preferably is one in which the alignment characteristics thereof can be altered, thus, the preference for nematic liquid crystal in which alignment is affected by surface interaction, on the one hand, and/or by application of electric field, on the other hand.

Still further, as to the material of which the liquid crystal is formed, the same may be smectic liquid crystal or operationally smectic liquid crystal, the latter indicating that the liquid crystal tends to function as smectic liquid crystal would function. Smectic liquid crystal, though, tends to have a memory characteristic, vis-a-vis alignment thereof, and, therefore, it may be necessary when using smectic liquid crystal to apply not only an electric field generally in a direction orthogonal to the axis 15, e.g., as in FIG. 3, but also to apply an electric field in a direction generally parallel to the axis 15 to reset the liquid crystal structure to the configuration of FIG. 2 after the liquid crystal structure had been placed in the orientation of FIG. 3.

The liquid crystal material should be alignable along the major axis direction or elongation direction of the volumes 13, i.e., axis 15. Moreover, the liquid crystal material must be able to have its structural alignment changed from the alignment along axis 15 to another alignment, e.g., to the alignment orthogonal to the axis 15, as is shown in FIG. 3, as a function of a prescribed input. Such prescribed input may be an electric field, as is illustrated in detail in the drawings. Alternatively, such prescribed input may be a magnetic field that causes appropriate orientation of liquid crystal structure, as is well known. Still further, although less desirable, the prescribed input may be a thermal input; in such case, for example, the thermal input may raise the temperature of the liquid crystal material to cause the liquid crystal material to be in isotropic phase, thus losing the structural alignment characteristics thereof whereupon the pleochroic dye would tend to be in random orientation so that the exiting light from the polarizer 10 would tend to be unpolarized. In the latter case, cooling of the liquid crystal material would tend to cause the same to reobtain the structural alignment condition of a nematic phase, for example, so that the output light 32 would be linearly polarized again.

The liquid crystal material used in accordance with the invention could be any of the liquid crystal materials identified herein or other liquid crystal material, for example, those disclosed in the above-mentioned patents, that function and have the operational characteristics described herein.

The liquid crystal material preferably is transparent and has a low birefringence characteristic. More particularly, liquid crystal material is known to have both ordinary and extraordinary indices of refraction, and birefringence is the difference between such indices. In a low birefringence liquid crystal material, such indices of refraction are matched so as to be the same or nearly the same, i.e., the difference is relatively small. Moreover, preferably, the index of refraction of the containment medium 12 and the indices of refraction of the low birefringence liquid crystal material are matched or are substantially the same. More particularly, for optimum operation, the ordinary index of refraction of the liquid crystal material should be matched to the index of refraction of the containment medium or should be nearly matched thereto to minimize scattering of light when the liquid crystal material is in the presence of the prescribed input, e.g., the electric field, and is oriented in the manner illustrated in FIG. 3. As was noted, such characteristic tends to eliminate or at least to minimize scattering when the output light is intended to be unpolarized.

The invention also will function when the liquid crystal material is not a low birefringence material. In such case, the ordinary index of refraction should be matched to that of the containment medium so that unpolarized incident light 31 transmitted through the liquid crystal which is aligned generally in the direction of propagation, e.g., as in FIG. 3, will exit as unpolarized light 33 without substantial scattering. On the other hand, in the absence of the prescribed input, when the liquid crystal is oriented in the manner illustrated in FIG. 2, for example, although light will tend to be scattered due to a mismatch between the index of refraction of the liquid crystal and the index of refraction of the containment medium, nevertheless, the exiting light 32, including that which is scattered, has been found to be linearly polarized.

In the preferred embodiment the electrical response characteristics of the liquid crystal material should be such that it will align with respect to an applied electric field E. Liquid crystal material, especially that of the nematic type, is known to have two different dielectric coefficients, an ordinary dielectric coefficient and an extraordinary dielectric coefficient. Due to the difference in such dielectric coefficients, the liquid crystal material will tend to align with respect to an applied electric field. For known liquid crystal materials, the smaller the birefringence is, the smaller the difference between the dielectric coefficients tends the be; on the other hand, it is desirable to provide an adequately large difference between the dielectric coefficients so that the liquid crystal structure will tend to orient with respect to an applied electric field, especially an electric field of reasonable magnitude, e.g., 40 volts or less, the smaller the better, although such magnitude is not intended to be limiting on the invention. Therefore, it will be appreciated that it will ordinarily not be possible for known liquid crystal materials to have zero birefringence, for there must be some birefringence in order to have adequate difference between dielectric coefficients to achieve the desired alignment.

The liquid crystal material preferably is an oil-base material that is able to form an emulsion with a water-base containment medium 12. Alternatively, the liquid crystal material may be soluble in the containment medium before and/or during manufacturing of the polarizer 10; but the liquid crystal material should not be soluble in the containment medium after the containment medium has set up as a solid or substantially solid material with the elongate volumes 13 therein. An example of formation of liquid crystal volumes in the containment medium, wherein the liquid crystal material is soluble in the liquid containment medium is disclosed in several of the above-mentioned patents.

Exemplary liquid crystal materials that are useful in accordance with the invention are dicyclohexanes and phenylcyclohexanes, these being preferred because they are relatively low birefringence materials, and the ordinary and extraordinary indices of refraction thereof are relatively low so as to facilitate matching with the index of refraction of the containment medium 12. Other exemplary materials are cyanobiphenyl materials and esters. Still further, liquid crystal materials that are disclosed in the above-mentioned patents also may be used in accordance with the present invention, as long as they provide the operational/functional characteristics described herein.

Other specific exemplary liquid crystal materials useful in accordance with the invention are those manufactured and/or sold by E. Merck and identified by the code numbers ZLI-1646, ZLI-2359, ZLI-1800, and ZLI-4119.

The containment medium 12 preferably forms a three-dimensional matrix of volumes 13, as was mentioned above. Such containment medium has properties to form such matrix of elongate volumes to contain the liquid crystal material 11 and the pleochroic dye 30 therein, preferably without leakage. The material of which the containment medium 12 is formed is able to provide the surfaces or walls 14 which define the volumes 13 for the purpose of interacting with the liquid crystal to cause, to influence, or to affect alignment of the liquid crystal structure so as to be generally in parallel with the major axis 15 of the respective volumes.

The containment medium 12 preferably is a material that forms an emulsion with the liquid crystal material 11, which preferably is an oil base material; therefore, the containment medium 12 preferably is a water base material.

Alternatively, as is elsewhere mentioned herein, the containment medium may be such that the liquid crystal material is soluble therein and is able to undergo curing such that the liquid crystal condenses out to form the volumes 13 thereof. This alternative is less preferred than the circumstance in which the liquid crystal is not soluble in the containment medium, for when the liquid crystal is so soluble, the pleochroic dye also tends to be soluble but does not condense out like the liquid crystal material does during curing of the containment medium. In such case other means or other pleochroic dyes than those conventionally available may be necessary to obtain the desired polarization effects of the invention.

According to the invention, the containment medium 12 with the liquid crystal and pleochroic dye therein should be able to be cast in a continuous process. Therefore, desirably, the containment medium and the liquid crystal material and pleochroic dye therein should have adequate viscosity, fluidity, and curing/set up characteristics to enable such casting.

Optically, the containment medium 12 should be transparent and should not be optically active. If desired, the containment medium may contain a color tinting material, such as non-pleochroic dye or other material. Additionally, the index of refraction of the containment medium should be the same as or at least close to the same as the ordinary index of refraction of the liquid crystal material.

Electrically, the impedance of the containment medium 12, especially including the liquid crystal material 11 and pleochroic dye 30 in volumes 13 therein, should be such that adequate electric field can be applied across the liquid crystal material to achieve the desired alignment thereof, e.g., as is illustrated in FIG. 3. Of course, if the prescribed input to the polarizer is magnetic field, the characteristics of the containment medium, liquid crystal material and pleochroic dye should be such that adequate magnetic field can be conveniently applied to the liquid crystal material to achieve the desired alignment with respect thereto.

The containment medium 12 should be a stable material. It should not degrade in physical integrity and should no t discolor in response to ultraviolet light/radiation. If desired a separate ultraviolet radiation absorber may be employed to protect the containment medium 12, the pleochroic dye, and/or the liquid crystal material 11 from undesirable affects of ultraviolet radiation. The containment medium 12 should not chemically affect the liquid crystal material or pleochroic dye; and such liquid crystal material and pleochroic dye likewise should not chemically affect the containment medium.

In order to form the elongate volumes 13, as will be described elsewhere herein, it is desired to stretch a film formed of the emulsion of containment medium, liquid crystal and pleochroic dye, thus elongating the otherwise generally spherical volumes. To facilitate such stretching it is desirable that the film, particularly the containment medium 12, have elastic characteristics, thus being a visco-elastic material during the stage between casting thereof and final curing thereof. To provide such elasticity and also preferably to provide flexibility for the film during curing and after curing, it is desirable to add a plasticizer to the containment medium. An exemplary plasticizer is glycerine. Other plasticizers also may be used, such as ethylene glycol and propylene glycol. Other materials which are operable to plasticize the containment medium, e.g., polyvinyl alcohol containment medium or another of the containment media mentioned herein, which do not interact with the liquid crystal material, also may be used.

The volumes 13 in the containment medium preferably are arranged in a three-dimensional matrix, i.e., they are arranged relative to each other in spaced apart relationship in all three orthogonal coordinate directions, x, y, z. The major axes 15 of such volumes should be parallel, as is illustrated in FIGS. 1-3. The volumes should have a relatively maximum elongation that is obtainable; generally the longer the better or the larger the aspect ratio the better. The diameter of the volumes at the widest part should be small enough that the liquid crystal structure in the volume tends to be organized preferentially in the direction of the major axis 15 when in the absence of a prescribed input, such as electric field E. Preferably the volumes are interconnected to maximize elongation and to minimize ends where relatively short radius of curvature would occur, while also minimizing lateral interconnections or cross components between volumes, i.e., in the direction orthogonal to the axis 15, where alignment other than in the direction of the axis 15 may tend to occur. In the preferred embodiment and best mode, the volumes 15 are generally tube-like or cylindrical; width diameter may be from about ⅓ micron to about 7 microns; aspect ration of length to diameter should be as great as possible. The dimensions mentioned herein are intended to be exemplary and not limiting.

One exemplary material for the containment medium is polyvinyl alcohol (PVA), e.g. such as the purified PVA mentioned in U.S. Pat. No. 4,435,047. Other materials include those mentioned in the several patents identified above. Still other containment media include polyurethane, latex polyurethane, other latexes or water soluble polymers, resin, epoxy, acrylic latex and so on. Most preferably the containment medium should be water soluble so it does not dissolve the liquid crystal and pleochroic dye, although this is not essential as long as volumes of liquid crystal and pleochroic dye according to the invention can be formed and can function as is described herein.

If desired a further support and/or protective structure of glass, plastic or other material may be provided to support and to protect the containment medium and volumes of pleochroic dye and liquid crystal material therein. For example, such glass may include plural sheets thereof between which is sandwiched the polarizer 10; the glass helping to prevent degradation of the pleochroic dye with time, certain radiation, etc.

Turning, now, to the light polarizing material, e.g., the pleochroic dye 30, such material is operative to polarize light or to affect polarization of light in a controllable fashion to vary the extent or amount of such polarization. If the dye is fully aligned in one of the directions illustrated in FIGS. 2 or 3, then the output light 32 or 33 would be substantially linearly polarized or substantially unpolarized, respectively. If the dye is partly aligned with respect to the field E, then the output light would tend to have more polarization characteristic than the unpolarized light 33 of FIG. 3, but less polarization characteristic than the substantially fully linearly polarized light 32 of FIG. 2.

The material for affecting polarization 30 preferably is pleochroic dye, sometimes referred to as dichroic dye. Exemplary dyes are disclosed in a number of the above-identified patents and may be used herein. Preferably the pleochroic dye is colorless when the polarizer is concerned primarily with polarization control without concern with color; but if desired the dye may be such that it selectively absorbs and transmits certain respective colors, e.g., as a function of alignment thereof.

The pleochroic dye operates to linearly polarize light that is incident thereon. The incident direction is generally perpendicular to the plane in which the dye is aligned. The dye tends to absorb the electric vector of the incident light which vector is in the direction of the axis of the liquid crystal. Therefore, the plane of polarization of light transmitted by the dye is orthogonal to the axial direction of the dye. The dye tends not to polarize light that is incident on the dye in a direction along the axis of the dye. Moreover, as was described above, the dye is alignable in the same direction as the liquid crystal in guest-host relationship.

Figure 4:
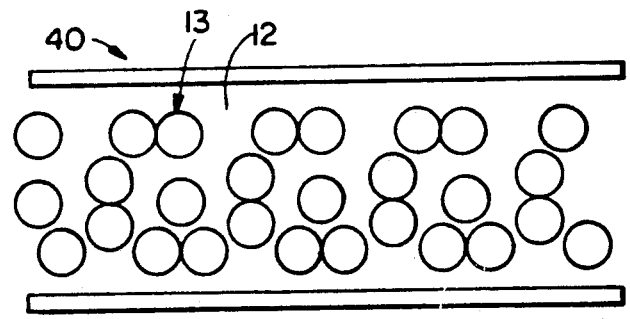
FIG. 4 is a schematic illustration of a cast emulsion to make a film-like material embodying the controlled liquid crystal optical polarizer of the invention.
Figure 5:
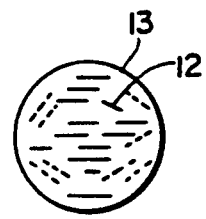
FIG. 5 is a schematic representation of one volume of liquid crystal material in the containment medium of which the cast emulsion of FIG. 4 is formed.

Turning, now, to FIGS. 4 and 5, a cast film of an emulsion of liquid crystal material and pleochroic dye in volumes 13 in a containment medium 12 is illustrated at 40. The film includes multiple layers of volumes 13 randomly distributed in the emulsion. The dark black lines at the top and bottom designate the limits of the containment medium surfaces. In FIG. 5 is illustrated a single exemplary liquid crystal volume 13 prior to stretching of the film 40. It can be seen that the volume 13 tends to be generally spherical and the liquid crystal material therein tends to be oriented at random. More particularly, as is described in U.S. Pat. No. 4,435,047 and others of the above-mentioned patents, such liquid crystal material would tend to be curvilinearly aligned in the absence of an electric field.

Figure 6:
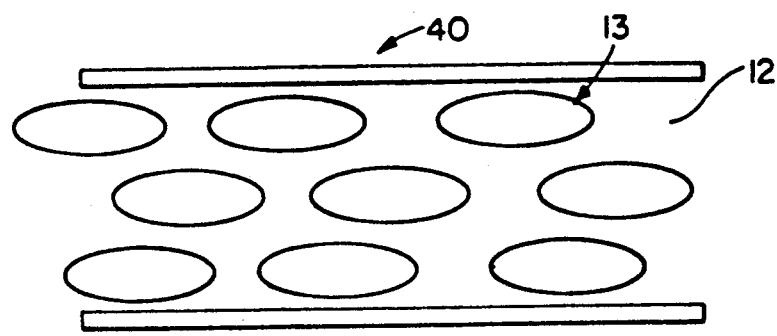
FIG. 6 is a schematic illustration of the cast emulsion film-like material of FIG. 4 stretched to form elongate volumes of liquid crystal therein.
Figure 7:
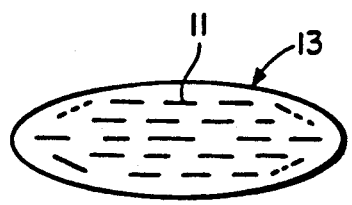
FIGS. 7 and 8 are schematic illustrations of an elongate volume of liquid crystal of the stretched emulsion film-like material of FIG. 6, respectively, in the absence of a prescribed input and in the presence of a prescribed input.
Figure 8:
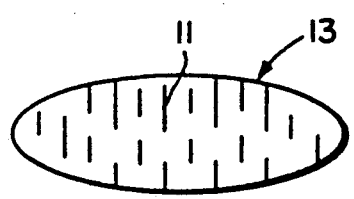

According to the invention, the cast emulsion film 40 is stretched, as is illustrated in FIGS. 6-8. The stretching preferably is uniaxial to cause the volumes 13 to become elongated in the manner illustrated in FIGS. 1-3 and 6-8. After satisfactory curing, solidifying, drying, etc., of the film 40, the film forms the variable polarizer 10 of the invention. Preferably electrodes 22, 23 would be added to the polarizer 10 to provide the desired prescribed input thereto, although such electrodes and/or the electric field may be supplied by another external device; and if the input is a magnetic field or thermal energy, the electrodes also would not be necessary for the polarizer 10.

In FIGS. 7 and 8 the alignment characteristics of the liquid crystal material 11 are illustrated. In FIG. 7 in the absence of the prescribed input, e.g., electric field E, the liquid crystal assumes a structural orientation along the direction of the elongate volumes 13. In the presence of the field depicted in FIG. 8, the liquid crystal structure aligns with the field and across the major axis of the volume 13. Such alignment and re-alignment are achieved due, respectively, to interaction with the surface of the volumes and to the electric field. The pleochroic dye 30 also would tend to align with the liquid crystal structure orientation, as was described above.

Figure 9:
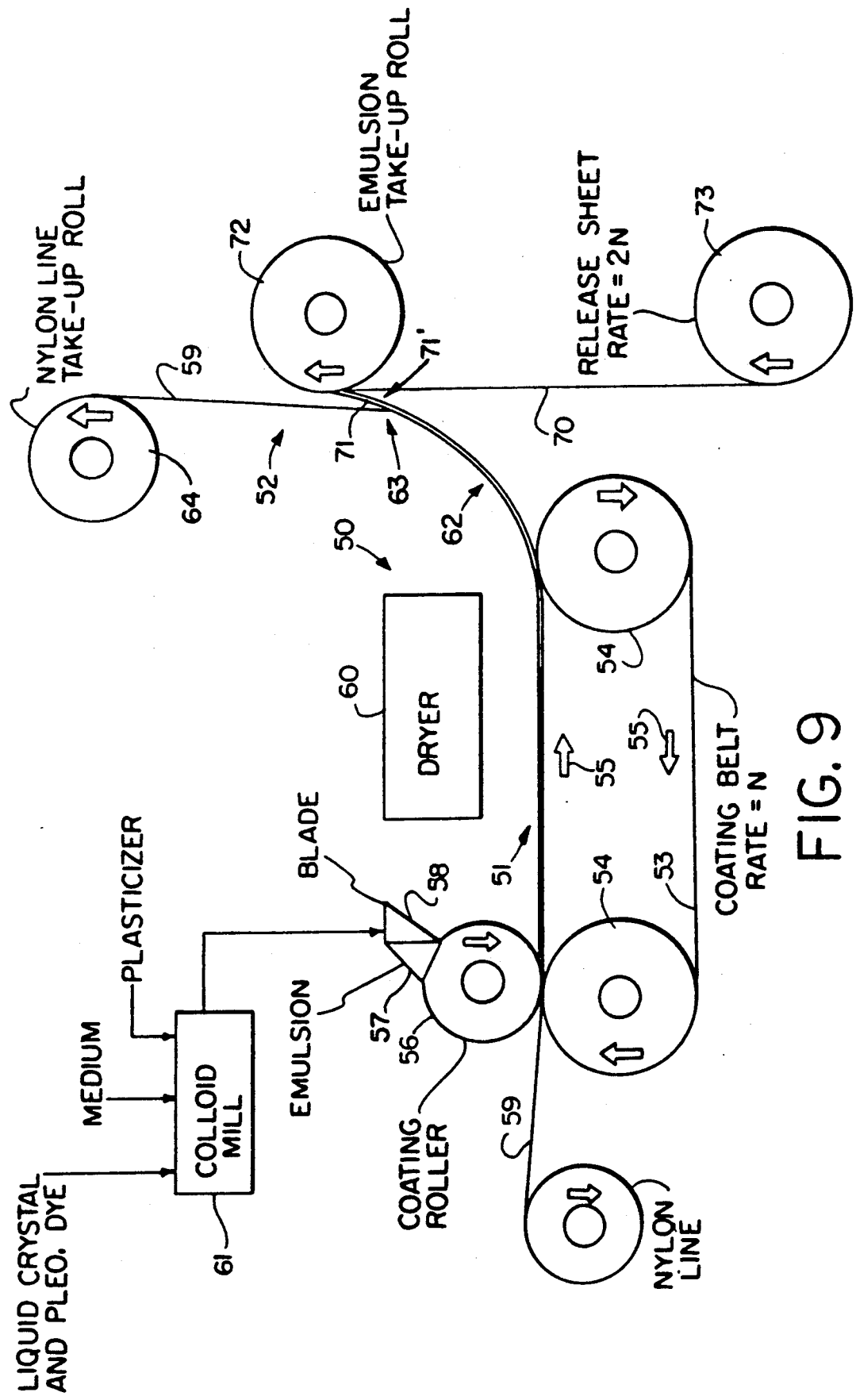
FIG. 9 is a schematic illustration of an apparatus for making in a continuous process a film-like material of a controlled liquid crystal optical polarizer in accordance with the invention.

Turning to FIG. 9, an apparatus and method for making the controlled liquid crystal optical polarizer 10 in accordance with the invention is depicted at 50. The apparatus 50 is in the form of a reverse roll casting machine 51 with a stretching device 52. The reverse roll casting machine 51 includes a cyclical conveyor belt or coating belt 53, which moves along rollers 54 powered by a conventional motor and controlled by conventional controls, e.g, as to speed, etc. The belt 53 moves in the direction of the arrows 55. The machine 51 also includes a coating roller 56, which rotates in the direction indicated to apply, to deposit, or to cast the emulsion 57 of containment medium 12, liquid crystal material 11, pleochroic dye 30 and plasticizer on the belt 53.

A conventional blade 58 is provided to determine the thickness of the emulsion layer so deposited. A dryer 60 of conventional design is employed to dry the emulsion, e.g. drying out the water from the polyvinyl alcohol thereby to cure the emulsion to a film form that has adequate structural integrity so that it can be drawn up by the stretching apparatus 52 and stretched.

A colloid mill 61 is provided to form the emulsion of liquid crystal material, pleochroic dye, plasticizer, and containment medium and to deliver the emulsion 57 to the casting machine 50. Preferably such emulsion is continuously formed and the casting is performed as a continuous process; likewise, the stretching by the stretching apparatus 52 preferably is continuous. Means other than a colloid mill also may be used to form the emulsion 57. A source of nylon or other string-like substance 59 may be used to be drawn along with the emulsion on the belt 53. Such string may be used to draw the film up to the stretching apparatus 52, e.g., as is illustrated at 62. Thereafter, the film may be drawn by the stretch apparatus while the string is peeled from the film or is cut therefrom at the area 63, and the string is taken up by a take-up roll 64. Such string, therefore, preferably is located at one or at both edges of the film as it travels along the coating apparatus 50.

The stretch apparatus 52 includes a release sheet 70 of Mylar or other material that may be used to draw the film 71 onto an emulsion take-up roll 72 to cause stretching of the film and, thus, formation of the polarizer 10 with elongate volumes 13 of liquid crystal 11 in the containment medium 12. The release sheet is supplied from a first storage roll 73. The speed of travel of the release sheet should be greater than the speed of travel of the film at 71 thereby to cause the desired application of stress to the film and, thus, the desired stretching to cause the desired elongation of the volumes. An exemplary speed differential may be, for example, a factor of two; other differentials also may be employed After the film 71' has been drawn onto the roll 72, it can later be rolled off such roll for use as a polarizer; the film then can be cut to a desired size; the release sheet 70 may be left adhering to the film or may be removed.

Summarizing the method of making the polarizer 10, the ingredients used to form the emulsion are mixed and are emulsified, i.e., the liquid crystal material, pleochroic dye, plasticizer and containment medium. The film 71 is formed by a continuous casting method. The film is cured by a heater 60 or other means (including natural curing without external energy, etc.) in any event to tend to retain its film-like form and shape. Such film then has plural volumes of liquid crystal and pleochroic dye formed in the containment medium. The volumes may be generally spherical in order to tend to achieve the lowest free energy state thereof. Thereafter, the film is stretched to elongate the volumes, thus causing linearizing of the liquid crystal structure and corresponding orientation of the pleochroic dye. (Since the film is stretched to elongate the volumes, it will be appreciated that whether the initial volume shape is generally spherical or is some other shape ordinarily would not be critical.) The material is allowed to cure finally to retain its shape with the elongate volumes therein. Subsequently electrodes may be applied, if desired and necessary.

While the volumes 13 of liquid crystal material 11 may be spherical or other form, due to the stretching as is described herein, for the purpose of achieving elongate volumes, the initial shape of the volume prior to stretching ordinarily is not considered critical. Moreover, although it is preferred not to have interconnects between adjacent elongate volumes, such that those interconnects would result in liquid crystal therein being aligned (in the absence of a field) orthogonally to the major axis of the volume(s), due to stretching as is described, the existence of such interconnects and such a negative impact will be minimized. Indeed, if the interconnects in all three directions (x, y, z) in the initial cast emulsion of FIG. 4, for example, essentially were equivalent or averaged to be approximately equivalent throughout the matrix formed by the cast emulsion of FIG. 4, i.e., prior to stretching, then the stretching would tend to pull not only the volumes so as to elongate them, but also would tend to pull the interconnects so as to draw them into generally parallel or toward parallel relation with respect to the axis 13. As a comparison, such stretching would act in a manner similar to the way stretching of well-known chicken wire would tend to draw all of the lines of such wire into generally parallel relationship in the direction of stretch.

EXAMPLE 1

A mixture of liquid crystal material ZLI-1646 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

EXAMPLE 2

A mixture of liquid crystal material ZLI-2359 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

EXAMPLE 3

A mixture of liquid crystal material ZLI-1800 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

EXAMPLE 4

A mixture of liquid crystal material ZLI-4119 of E. Merck (20%), glycerine (20%) and polyvinyl alcohol PVA-205 of Air Products & Chemicals (60%) (the polyvinyl alcohol having a concentration or 25%, the balance being water), was mixed and an emulsion was formed thereof. The liquid crystal material included blue pleochroic dye M-141 of Mitsui Chemicals in a concentration of less than 1% of the liquid crystal material. The emulsion was cast to form a film, and the film was stretched in the above-described manner.

Other examples would include varied concentrations of the ingredients, e.g., such that the liquid crystal material may be increased in the range of from about 20% to about 30% and such that the plasticizer, e.g., glycerine, is varied in the range of from about 12% of the amount of the polyvinyl alcohol to about 25% of the amount of polyvinyl alcohol. Also, other concentrations of polyvinyl alcohol may be used.

As was noted above, the amount of pleochroic dye used in the invention is relatively small. This is due to the fact that the dye is used in the invention in a very efficient manner because reliance on the dye function is placed on use thereof in parallel or orthogonal orientation relative to the direction of incident light, especially when the dye is relied on for controlling polarization and not for coloring. Nevertheless, the dye also may be used for its color characteristics. Also, it will be appreciated that larger and smaller concentrations of dye relative to the amount mentioned above may be used in accordance with the invention.

Moreover, several other advantages inure to the invention, including those of relatively fast response, operation response to relatively low voltage (especially in view of the relatively thin film that may be used in accordance with the invention), and relatively low cost in view of the fact that a relatively small amount of liquid crystal and of dye is required for a given area of film used. Further advantages relate to relatively high clarity, low haze, ability to provide variable density control, selection of density range, and, of course, continuous manufacturing.

The present invention provides a number of techniques for controlling the intensity of light transmitted through an optical device, preferably without affecting or substantially without affecting the image characteristics of the transmitted light. Several solutions for providing such variable intensity control are described now.

Figure 10:
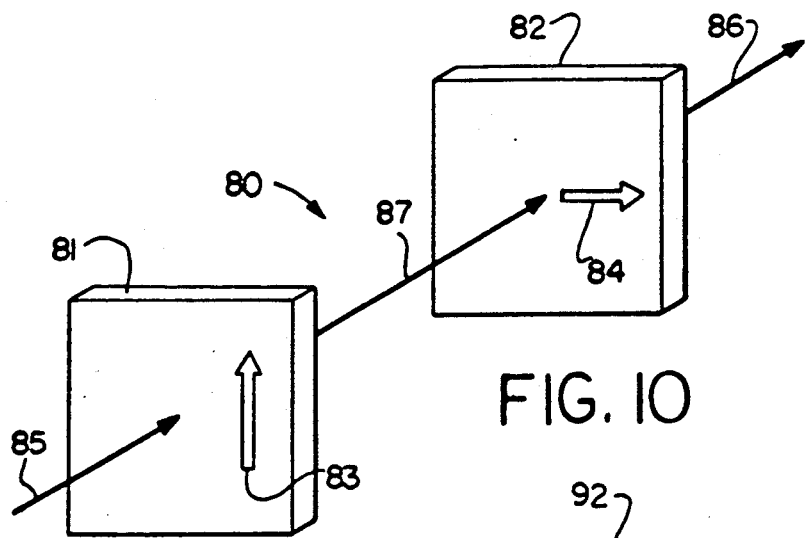
FIG. 10 is a schematic illustration of a variable density light control apparatus in accordance with the invention using a pair of polarizers that are crossed at 90 degrees.

Referring to FIG. 10, an embodiment of variable density light control apparatus 80 is schematically illustrated. The apparatus 80 includes a pair of polarizers 81, 82, which are operative to provide for linear polarization of light. The direction of the plane of polarization of the light transmitted through the respective polarizers 81, 82 is represented by arrows 83, 84, respectively. Thus, it will be appreciated that if the polarizers 81, 82 were oriented in the manner illustrated, i.e., with the respective polarization directions crossed at 90 degrees, in response to incident light 85 being directed on the apparatus 80, the intensity of output light 86 would be zero or very near zero, depending on the effectiveness of the respective polarizers.

However, by making at least one of the polarizers 81, 82 a variable polarizer, such as the polarizer 10 described above with reference to FIGS. 1 through 9, then by varying the magnitude of the prescribed input to such variable polarizer, the intensity of the output light 86 would be varied. For example, if the polarizer 81 were a variable polarizer, then light 87 exiting the same and also, therefore, incident on the polarizer 82, may be fully polarized when, say, no electric field is applied to the variable polarizer 81 or may be substantially unpolarized if adequate electric field is applied to the variable polarizer 81. Alternatively, the light 87 exiting the polarizer 81 may be partly polarized, for example, due to the magnitude of electric field applied to the variable polarizer 81 being between zero and the magnitude required to provide unpolarized light output, as was described above. Thus, it will be appreciated that if the polarizer 82 were a fixed polarizer (or were a variable polarizer in which the maximum polarization would be effected) the intensity of the light output 86 would be a function of the prescribed input to the polarizer 81 and, thus, the effective polarization of the variable polarizer 81. Although the polarizer 81 is described as the variable one and the polarizer 82 the fixed one, it is possible that reverse condition could exist and would operate according to the invention.

As a further alternative, it will be appreciated that both polarizers 81, 82 may be respective variable polarizers 10. In such case, the range of control of intensity of the output light 86 would be enlarged from the above-described example. More specifically, if one of the polarizers were fixed, then such polarizer would reduce the intensity of the light 87 incident thereon by about half; therefore, the range of variation of the output light as a function of the input light would be from about one-half the intensity of the input light 85 to zero. On the other hand, if both polarizers 81, 82 were able to provide substantially unpolarized output light, then the intensity of the output light 85 may vary in a range from about 100% the intensity of the incident light 85 to zero.

Figure 11:
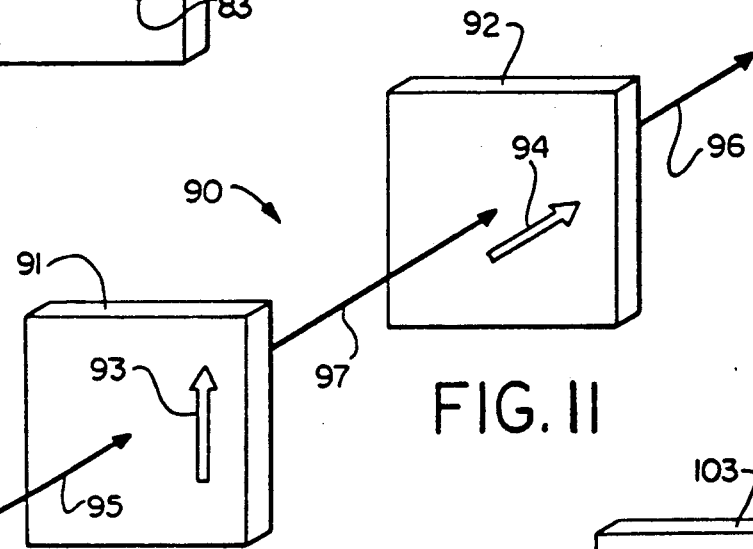
FIG. 11 is a schematic illustration of a variable density light control apparatus in accordance with the invention using a pair of polarizers that are crossed at less than 90 degrees.

Turning to FIG. 11, a modified variable density light control apparatus is designated 90. The apparatus 90 includes a pair of polarizers 91, 92, the directions of linear polarization of output light passing therefrom being indicated, respectively, by arrows 93, 94, as was the case, for example, in the apparatus 80 of FIG. 10. The directions 93, 94 of linearly polarized light able to be transmitted by the respective polarizers 91, 92 are crossed relative to each other, but such crossing is other than at right angles or 90 degrees. Therefore, in response to input light 95, the apparatus 90 would be unable to produce a fully extinguished or zero intensity output light 96. More specifically, assuming polarizers 91, 92 were fully polarizing, the light 97 output from polarizer 91 and incident on polarizer 92 would include components that are not orthogonal with respect to the direction 94, and such components in fact would tend to be transmitted to compose the output light 96.

It will be appreciated that the foregoing examples and description are only exemplary and are not intended to be limiting on the invention. Rather, the scope of the invention is intended to be defined by the following claims.

In the apparatus 90 of FIG. 11, one of the polarizers 91, 92 is variable, e.g., as the variable polarizer 10 described above, and the other polarizer may be variable or fixed, as was the case in the apparatus 80 of FIG. 10. If one of the polarizers is fixed, then the maximum intensity of the output light 96 would be approximately one-half the intensity of the incident light 95 for the above-described reasons. The minimum intensity would be a function of the angular relationship between the directions 93, 94 when the variable polarizer one of the two polarizers 91, 92 is in maximum polarizing mode, e.g., in the absence of the prescribed input thereto.

Alternatively, both polarizers 91, 92 may be variable polarizers, e.g., as the variable polarizer 10. In such case, maximum intensity of the output light 96 may be approximately equal to the intensity of the incident light 95, and minimum intensity of the light 96 would be a function of the angular relationships 93, 94, but in any event would not go to zero. Thus, it will be appreciated that the variable density light control apparatus 90 provides a range of light control that avoids full extinction of the output light 96.

The apparatus 80, 90 may be utilized in a variety of optical devices. Examples include displays, eye glasses, sun glasses, windows, and other devices in which a variable control of light transmission is desired. For example, a display 80, is illustrated in FIG. 15.

Figure 15:
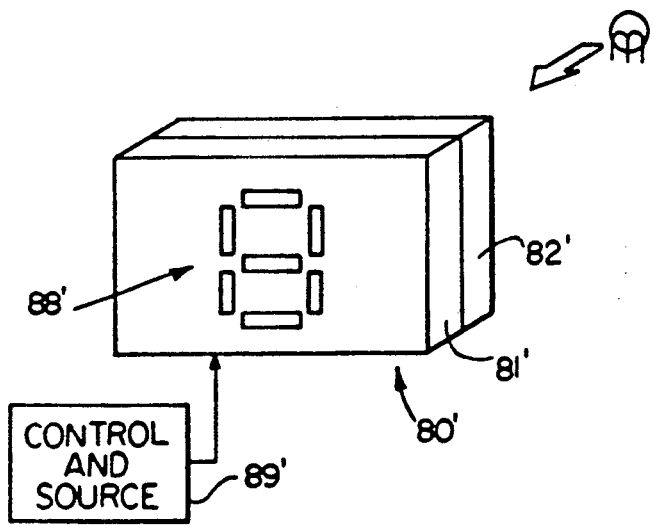
FIG. 15 is a schematic illustration of a display using a pair of polarizers, at least one of which is controllable, according to the invention.

In FIG. 15 and the subsequent figures primed reference numerals designate the same or similar elements as the corresponding unprimed reference numerals designate in the other figures. The display 80' includes a pair of polarizers 81', 82', which are arranged in optical serial relation, e.g., substantially sandwiched together and a patterned electrode arrangement 88', which would be selectively energized by appropriate control apparatus and voltage source 89'. The patterned electrode arrangement 88' would be on both polarizers 81', 82', and appropriate electrical insulation would be provided to avoid short circuits. The electrode arrangement 88' illustrated, for example, is in the fashion of a seven segment display capable of displaying most, if not all, alphanumeric characters, as is quite conventional. Other patterns or arrangements of electrodes also may be used. Depending on which of the electrodes is energized by the source 89' or is not so energized, various alphanumeric characters would be shown on the display 80'. For example, if none of the electrode segments was energized, then a number "8" appearing dark against a light background would be displayed. If the lower left segment, as is viewed in FIG. 15, were energized, at least some light would tend to be transmitted therethrough, whereby the number "9" would tend to be displayed, and so on.

Figure 16:
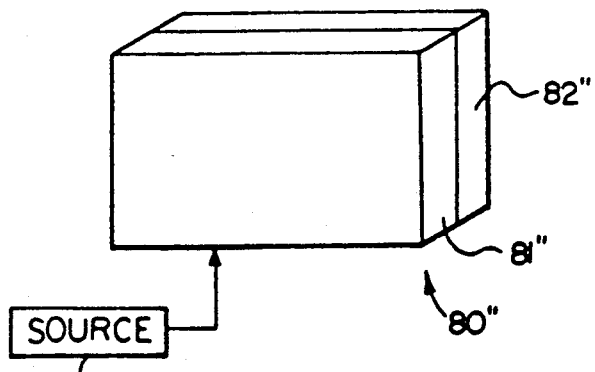
FIG. 16 is a schematic illustration of a window using a pair of polarizers, at least one of which is controllable, according to the invention.

A window 80" is illustrated in FIG. 16. Such window may include a plurality of polarizers 81", 82", which may be the same as the polarizers and have the same relationship as the polarizers 81, 82, which are described above with reference to FIG. 10. A voltage source 89" is connected to electrodes of the respective polarizers 81", 82" selectively to apply appropriate electric field thereto. Accordingly, by varying the voltage, the intensity of light transmitted through the window 80" can be controlled.

It will be appreciated that the display 80' and the window 80" alternatively may employ the apparatus 90 of FIG. 11 in which case the full light extinction possible to be had using the apparatus 80 would not be possible. Moreover, it will be appreciated that in the display 80' and the window 80", the range of intensity control will be a function of the range of voltage applied by the respective source and whether one or both of the polarizers thereof is a variable type.

Figure 17:
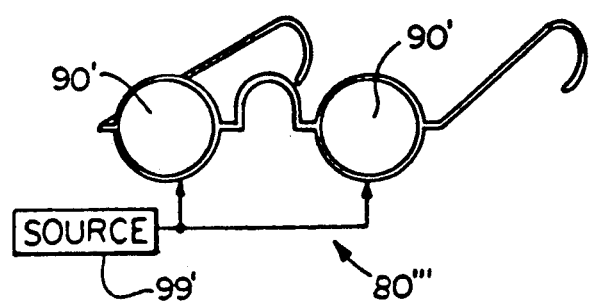
FIG. 17 is a schematic illustration of a pair of eye glasses using a pair of polarizers, at least one of which is controllable, according to the invention.

Furthermore, in FIG. 17 is depicted glasses 80'" for eyewear. The glasses 80'" includes in the respective eyepieces a variable density light control apparatus 90', which preferably is the same as the apparatus 90 described above with reference to FIG. 11. The apparatus 90' may be controlled in response to a source 99', which applies appropriate electrical input thereto to control the intensity of light transmitted therethrough. The range of such intensity control would be a function of whether the two polarizers 91, 92 in the apparatus 90' in fact are both variable or one is variable and one is fixed, as was described above with reference to the apparatus 90 of FIG. 11. Moreover, the source 99', which is electrically connected in the manner illustrated in FIG. 17 to both apparatus 90', may be a battery or may be a separate solar cell, photocell or the like with appropriate circuitry, so as to respond to intensity of ambient light conditions thereby to effect corresponding intensity control by the apparatuses 90'.

In the above-described devices of FIGS. 10, 11, and 15-17, the pleochroic dye used may be neutral density, i.e., colorless, or may have color characteristics so as to absorb one or more colors and to transmit one or more colors; and such color characteristics may be a function of dye alignment. Therefore, the color of the output light, for example output light 86 or 96, may be a function of the color characteristics and the alignment of the pleochroic dye used in the respective polarizers of the respective apparatuses 80, 90.

Figure 12:
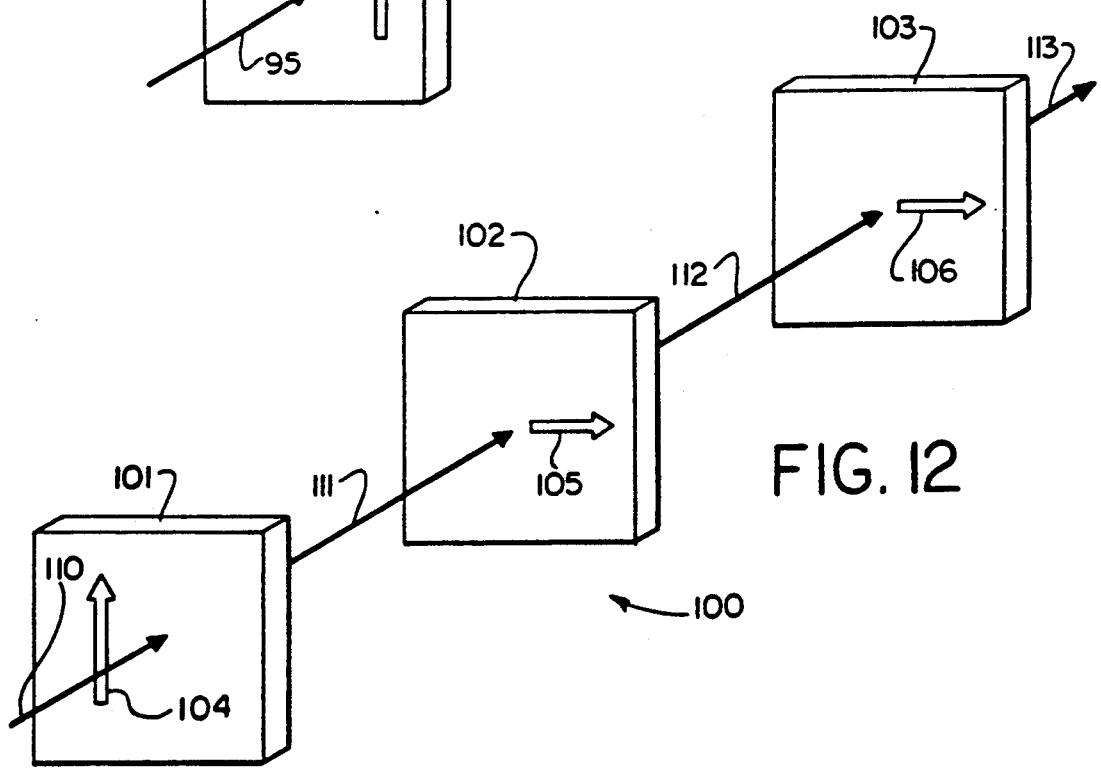
FIG. 12 is a schematic illustration of a variable density light control apparatus according to the invention that also provides for variable color and intensity control.

Another color control concept is illustrated in the variable density light control apparatus 100 illustrated in FIG. 12. The apparatus 100 includes three polarizers 101, 102, 103, the directions of polarization of linearly polarized light transmitted respectively therethrough being indicated by the arrows 104, 105, 106. The various portions of light passing through the apparatus 100 are represented by arrows 110 (the incident light to the apparatus 100), 111, 112, and 113 (the output light from the apparatus 100). The polarizer 101 may be a variable polarizer or a fixed polarizer. The polarizers 102, 103 preferably are variable polarizers. Moreover, the polarizers 102, 103 preferably have the characteristics not only of being variable polarizers but also of varying the color absorbing/transmitting characteristics thereof as a function of alignment of the dye therein and preferably are complementary, as is described further below.

In operation of the apparatus 100, the polarizer 102 is operative to transmit white light when not polarizing and as the extent of polarization increases, i.e., as the magnitude of electric field thereto decreases, to increase light absorption of all colors but yellow. The polarizer 103 operates similarly to the polarizer 102 except that instead of transmitting yellow light, it operates to transmit blue light. Accordingly, as a function of alignment in the variable polarizers 102, 103, as was described above with respect to the variable polarizer 10, for example, the color of the output light 113 may be substantially white, substantially yellow, substantially blue, or a mixture of yellow and blue, which tends toward gray and at maximum filtration would be approximately black, inasmuch as yellow and blue are complementary.

If the polarizer 101 were a fixed polarizer, then intensity of light output 113, as well as color, would be a function of the alignment characteristics of liquid crystal and pleochroic dye in the variable polarizers 102, 103. Moreover, if the polarizer 101 were a variable polarizer, e.g., as the polarizer 10 described above, then the intensity of output light 113 would be a function both of the alignment, and thus polarization, characteristic of the polarizer 101, as well as the alignment characteristics of the polarizers 102, 103.

Figure 18:
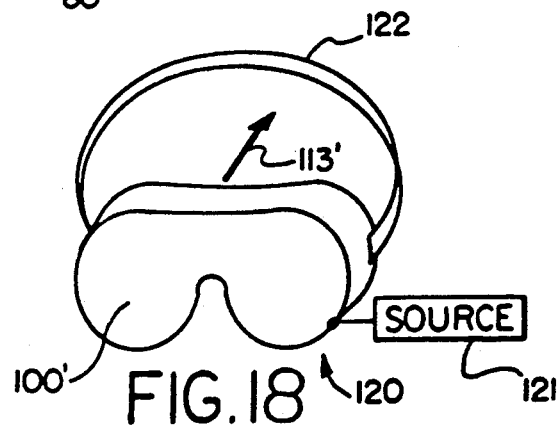
FIG. 18 is a schematic illustration of a pair of ski goggles with color control function using a pair of polarizers, at least one of which is controllable, according to the invention.

Briefly referring to FIG. 18, a ski goggle 120 is illustrated. The ski goggle 120 employs the variable density light control apparatus 100 described above with reference to FIG. 12. A voltage source 121 may be used to provide electrical input. The source 121 may be a controlled one that can be adjusted by the user to determine the color and intensity of light 113', which would be received by the user's eyes, the goggle 120 being held by a strap 122 to the head of the user. Alternatively, the source 121 may be a photovoltaic and/or photosensitive one that provides electrical input of appropriate voltage to the lens apparatus 100', which is the same device as depicted at 100 in FIG. 12, automatically to control the color and intensity of the light 113' as a function of the intensity and/or other characteristics of ambient light conditions.

Figure 13:
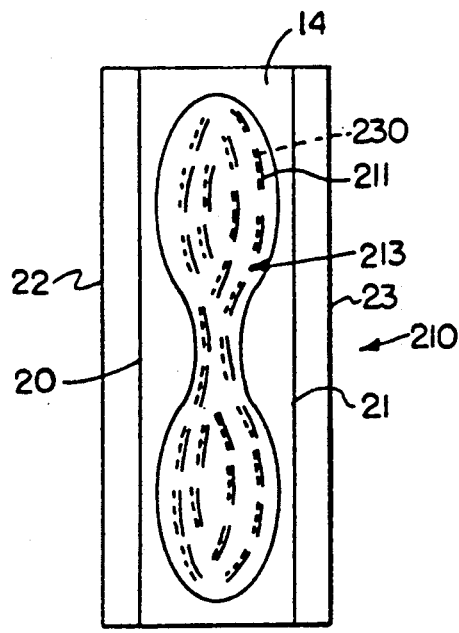
FIG. 13 is a schematic illustration of a modified polarizer in accordance with the invention that has a smaller degree of polarization capability than the polarizers earlier illustrated and described, it being appreciated that the modified polarizer of FIG. 13 may be utilized in the various other embodiments of the invention disclosed herein.

Referring back to FIG. 13, a modified polarizer 210, which is similar to the polarizer 10 described above, is illustrated. However, in the modified polarizer 210, the size and shape characteristics of the volume 213 are such that there is greater curvature than in the volume 13 of the polarizer 10 illustrated in FIGS. 1-3. The greater curvature may be due to reduced stretching relative to the amount of stretching used to form the polarizer 10. As a result of the reduced stretching and the shape characteristics of the volume 213, there will tend to be some nonlinear, e.g., somewhat curved, alignment of the structure of the liquid crystal 211 and pleochroic dye 230 relative to the straighter alignment of the polarizer 10. Therefore, even in the absence of any electric field, the modified variable polarizer 210 would produce output light that is partly linearly polarized and partly unpolarized. Such polarizer 210 may be utilized in the several embodiments of the invention described herein for the purpose of providing light polarizing function that is less than that achieved in the variable polarizer 10. Therefore, for example, using the variable polarizer 210 in the apparatus 80, even in the absence of an electric field to either of the right angle crossed polarizers in optical series thereof, it would not be possible fully to extinguish the output light because some of the light transmitted by the variable polarizer 210 would be unpolarized, and, therefore, would be transmitted. Accordingly, it will be appreciated that the variable polarizer 210 may be utilized to alter the range over which light can be varied, for example, in the various devices disclosed herein relative to the range that would be obtained if a polarizer having a greater polarizing effect, such as the polarizer 10, would have.

It will be appreciated, of course, that in response to application of an electric field of adequate magnitude, e.g., about 40 to 45 volts, the liquid crystal 211 and the pleochroic dye 230 in the variable polarizer 210 would align with respect to the field in the manner depicted in FIG. 3, for example. Further, if the magnitude of the electric field were greater than zero and less than that which would obtain the alignment of FIG. 3, the liquid crystal and pleochroic dye in the polarizer 210 would be partly aligned and would transmit some polarized and some unpolarized light.

The variable polarizer 210 may employ pleochroic dye that has color characteristics for absorbing and transmitting respective colors or wavelengths as a function of alignment of the dye and, in particular, alignment relative to the direction of propagation of light through the dye. Due to the increased curvature in the polarizer 210 relative to that of the polarizer 10, absorption would be increased since the dye would tend to be curved and, for example, provide greater color absorption in the absence of an electric field. Therefore, with such dye having color characteristics, the polarizer 210 may be utilized as a single sheet device and provides both color (density) control and polarization (glare) control. The intensity control would be carried out by the light absorption characteristic of the dye. The glare control would be a function of the extent of polarization effected on the incident light.

Indeed, it will be appreciated that the various embodiments of the invention as disclosed herein, such as the apparatuses depicted in FIGS. 10 through 18 hereof, may be employed to provide both light intensity control and control of glare. It is known that glare can be reduced by increasing polarization; for this reason conventional polarized sun glasses often are preferred over pure light absorbing media.

Figure 14:
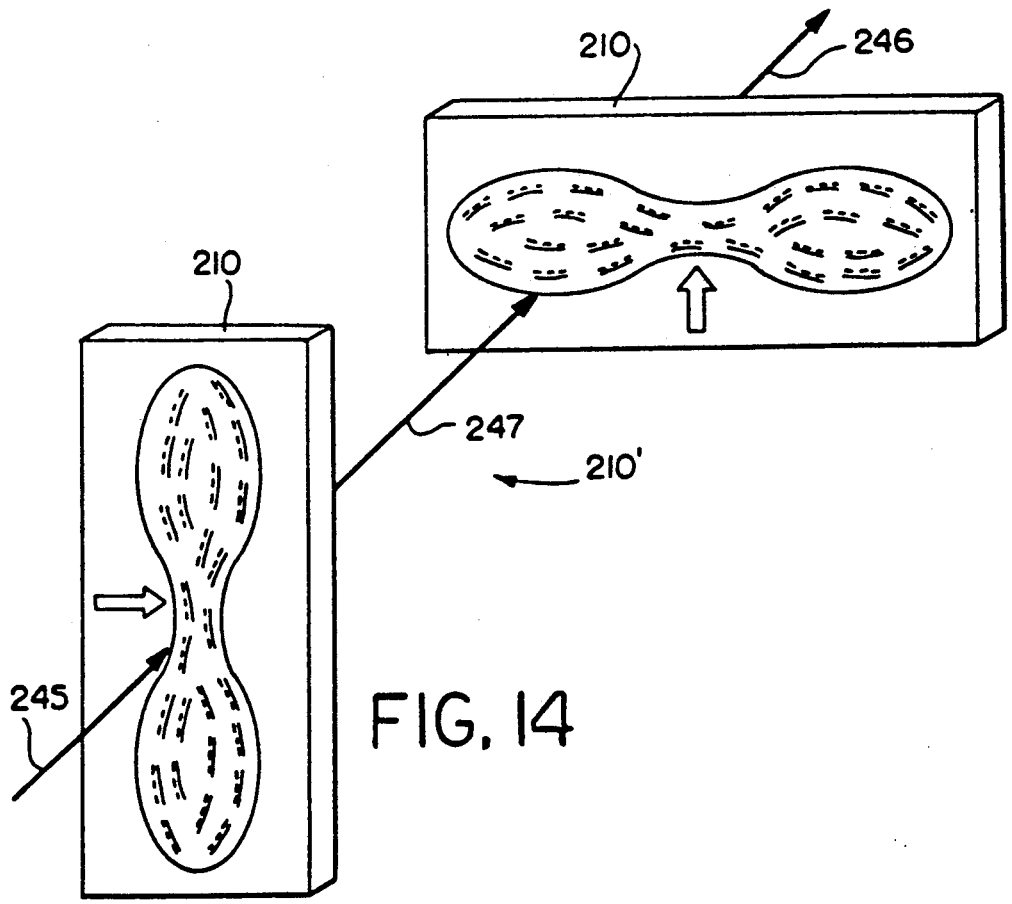
FIG. 14 is a schematic illustration of a variable density light control apparatus in accordance with the invention which uses the modified polarizer of FIG. 13.

In FIG. 14 is illustrated an apparatus 210', which utilizes a pair of variable polarizers 210, which have crossed polarization relationship. Since the polarizers 210 do not completely polarize light, even in the absence of the prescribed input, in response to input light 245, even in the absence of the prescribed input, the output light 246 would not be extinguished. Indeed, the output light 247 from the first polarizer 210 would have both polarized and unpolarized characteristics; and at least some of the unpolarized characteristics would be transmitted through the polarizer 210 and appear in the output light 246. In the presence of a prescribed input, both polarizers 210 would deliver substantially maximum output in order to maximize the output light 246 in response to the intensity of the input light 245. Therefore, it will be appreciated that the apparatus 210' may be substituted for the apparatus 90 in those instances where it is desired to provide intensity control without extinction of the output light.

In the several embodiments described with reference to FIGS. 10 through 18, it will be appreciated that appropriate electrical and/or other means may be employed to provide the prescribed input, the preferred embodiment employing electrical input and, thus, electric field, as was described above with reference to the variable polarizer 10. Moreover, it will be appreciated that in the illustrations of FIGS. 13 and 14, only an edge view is shown of a single interconnected elongate volume. It will be appreciated, though, that such illustration only is intended to be schematic. It is intended that there would be multiple volumes in the respective polarizer apparatus that could be made and used in the manner described above with reference to FIGS. 1 through 9.

The embodiments of the invention in which an exclusive property or privilege is claimed are defined as follows:

1. A variable density light control apparatus, comprising first and second polarizers having at least a partial crossed relation, and wherein at least one of said polarizers comprises a variable optical polarizer, including liquid crystal having low birefringence, containment means for containing said liquid crystal, means for affecting the structural alignment of said liquid crystal, said liquid crystal being responsive to a prescribed input to change such structural alignment, and means in said liquid crystal responsive to such structural alignment thereof for affecting polarization of light as a function of such alignment.

2. The apparatus of claim 1, wherein said means in said liquid crystal comprises pleochroic dye.

3. The apparatus of claim 2, wherein said pleochroic dye is generally colorless.

4. A light control apparatus comprising a variable polarizer responsive to a prescribed input to control the intensity of light transmission without affecting image characteristics or with minimal degradation of image characteristics, said variable polarizer comprising liquid crystal material responsive to said prescribed input in combination with pleochroic dye.

5. A light control apparatus comprising plural polarizers, at least one or more of which is a variable polarizer that is controlled in the amount of polarization effected thereby as a function of a prescribed input, and wherein one or more of said variable polarizers comprises low birefringence liquid crystal material having a structural alignment which corresponds generally to said amount of polarization.

6. The apparatus of claim 5, wherein at least one of said polarizers is a fixed polarizer.

7. A light control apparatus comprising plural polarizers, at least one or more of which is a variable polarizer that is controlled in the amount of polarization effected thereby as a function of a prescribed input; and
wherein at least two of said polarizers are of the variable polarizer type.

8. A light control apparatus comprising plural polarizers, at least one or more of which is a variable polarizer that is controlled in the amount of polarization effected thereby as a function of a prescribed input; and
wherein at least two of said polarizers are plane polarizers.

9. The apparatus of claim 8, wherein at least two of said plane polarizers have the respective polarization axes oriented in non-parallel relation.

10. A variable light transmission controlling device comprising a variable polarizer, means for sensing a characteristic of a condition in proximity to said variable polarizer, means responsive to such sensed characteristic for controlling the effectiveness of said variable polarizer, and wherein said variable polarizer comprises liquid crystal material.

11. A variable color device, comprising at least one variable polarizer that is color responsive and means for altering the polarization effectiveness of such polarizer.

12. A variable polarizer, comprising elongate volumes of liquid crystal material and pleochroic dye in a containment medium, and wherein the effectiveness of polarization is a function of the structural alignment of said pleochroic dye.

13. The variable polarizer of claim 12, wherein said pleochroic dye is in guest host relation with said liquid crystal material.

14. The polarizer of claim 12, wherein said pleochroic dye is generally colorless.

15. A variable polarizer, comprising elongate volumes of liquid crystal material in a containment medium, the effectiveness of polarization being a function of the aspect ratio of such volumes; and
wherein said liquid crystal material has a low birefringence characteristic and the index of refraction thereof is substantially the same as the index of refraction of said containment medium.

16. A display comprising a variable polarizer and a further polarizer, said variable polyester being responsive to a prescribed input to alter the amount of polarization effectiveness thereof; and
said variable polarizer comprising plural elongate volumes of low birefringent liquid crystal material in a containment medium.

17. The display of claim 16, further comprising pleochroic dye in said volumes and operative with said liquid crystal material in guest host relation.

18. The display of claim 16, further comprising input means for providing a prescribed input to said variable polarizer to control the polarization effectiveness thereof.

19. Eyewear for controlling the amount of polarization of light transmitted therethrough, comprising a support and variable polarizer means responsive to a prescribed input for controlling the amount of polarization of light transmitted therethrough.

20. The eyewear of claim 19, further comprising means for automatically sensing ambient light conditions and for controlling said variable polarizer.

21. The eyewear of claim 19, further comprising means for controlling said variable polarizer to determine the amount of polarization of light transmitted therethrough, said means for controlling including a source of energy.

22. The eyewear of claim 19, comprising at least one of goggles, eye glasses, and sun glasses.

23. A window, comprising means for controlling light transmission characteristics as a function of a prescribed input, the window being operative on a light polarization controlling basis, and including at least one variable polarizer comprising elongate volumes of low birefringence liquid crystal material in a containment medium.

24. The window of claim 23, further comprising a further polarizer in optical series with said variable polarizer.

25. The window of claim 23, further comprising pleochroic dye in said volumes and operative with said liquid crystal material in guest host relation.

26. The window of claim 25, wherein said plechroic dye is generally colorless.

27. The window of claim 23, further comprising means for providing such prescribed input.

* * * * *